United States Patent [19]

Takeshita

[11] 4,368,624
[45] Jan. 18, 1983

[54] ABSORPTION TYPE HEAT PUMP HAVING INDOOR AND OUTDOOR RADIATORS CONNECTED IN SERIES IN A WATER FLOW CIRCUIT DURING HEAT MODE

[75] Inventor: Isao Takeshita, Neyagawa, Japan

[73] Assignee: Matsushita Electric Industrial Company, Limited, Osaka, Japan

[21] Appl. No.: 240,591

[22] Filed: Mar. 4, 1981

[30] Foreign Application Priority Data

| Mar. 5, 1980 | [JP] | Japan | 55-28338 |
| Mar. 5, 1980 | [JP] | Japan | 55-28339 |
| Apr. 10, 1980 | [JP] | Japan | 55-47874 |

[51] Int. Cl.$^3$ ............................................. F25B 27/02
[52] U.S. Cl. ................................ 62/238.3; 62/324.2; 62/324.4; 62/476
[58] Field of Search .................... 62/159, 238.3, 476, 62/324.2, 324.4

[56] References Cited

U.S. PATENT DOCUMENTS

| 3,527,060 | 9/1970 | Kruggel | 62/476 |
| 4,285,209 | 8/1981 | Luthi et al. | 62/238.3 |
| 4,290,273 | 9/1981 | Meckler | 62/476 |
| 4,291,545 | 9/1981 | Worsham | 62/238.3 |

*Primary Examiner*—Lloyd L. King
*Attorney, Agent, or Firm*—Lowe, King, Price & Becker

[57] ABSTRACT

A heat pump comprises an indoor heat exchanger, an outdoor heat exchanger and a reversal valve which directs vapor phase refrigerant from a generator to the indoor heat exchanger during heating mode and to the outdoor heat exchanger during cooling mode. The reversal valve directs evaporated refrigerant to an absorber where it is absorbed by a strong solution supplied from the generator to generate absorption heat and a weak solution is pumped to the refrigerant generator. An indoor radiator and an outdoor radiator are connected in a closed loop water flow circuit during heating mode. A section of the water flow circuit passes through the absorber to extract heat therefrom to warm the indoor air by the indoor radiator. As a function of outdoor temperature, the water in the radiator is varied so that the temperature of the cooling water at the entry point of the absorber and hence the evaporation temperature is rendered variable so that the latter is automatically set at a point lower than the outdoor temperature to permit the outdoor heat exchanger to extract heat from the environment in a wide range of outdoor temperature variations. During cooling mode, the hot water from the absorber is routed to a second outdoor radiator bypassing the indoor radiator.

23 Claims, 13 Drawing Figures

ABSORPTION TYPE HEAT PUMP HAVING INDOOR AND OUTDOOR RADIATORS CONNECTED IN SERIES IN A WATER FLOW CIRCUIT DURING HEAT MODE

BACKGROUND OF THE INVENTION

The present invention relates to air conditioning systems, and in particular to heat pump systems of the absorption type in which naturally available liquid or gaseous fuel is used to generate vapor phase working fluid.

In consideration of the shortage of fuel and its rising cost, energy savings are of primary concern to designers of power plants for industrial or residential use. Since household air conditioning systems account for a substantial part of the total energy consumed by household appliances, the development of energy saving air conditioning systems, such as heat pumps, is of the utmost importance.

Heat pumps are generally classified under categories of the type in which the pressurized refrigerant is generated by an electrically driven compressor and the type in which the pressurized refrigerant is generated by a thermally driven source. Since the latter allows for highly efficient utilization of naturally available energy such as petroleum or gas rather than electric power which requires conversion from the natural energy source, attention is currently centered on the thermally driven type heat pump. Among the thermally driven type heat pumps the absorption type heat pump is preferred for household use because of its favorable characteristics in low maintenance and low noise.

In contrast with the electrically driven heat pump in which the evaporation temperature varies as a function of outdoor temperature, the absorption type heat pump is not capable of varying its evaporation temperature as a function of outdoor temperature so that the former is lower than the latter to extract heat from the environment because the evaporation temperature is determined solely by the absorption temperature of the solution in the absorber. The absorption type heat pump is thus not capable of operating satisfactorily in the heating mode when the outdoor temperature falls below the evaporation temperature.

The refrigerant concentration of the working fluid and its flow rate, if determined to achieve maximum efficiency for cooling operation, are inadequate for heating operation to permit the system to operate in a wide range of outdoor temperatures because the evaporation temperature is not below the outdoor temperature during cold weather. On the other hand, if the concentration is selected so that the evaporation temperature is always below the outdoor temperature during cold weather, frost is likely to form on the evaporator to thereby cause inefficiency during heating operation and the evaporation temperature is at a level too low causing inefficient cooling operation during hot weather.

SUMMARY OF THE INVENTION

It is therefore an object of the present invention to provide an air conditioning system of the absorption type in which the evaporation temperature is varied automatically as a function of the outdoor temperature to permit the system to operate satisfactorily over a wide range of outdoor temperatures.

In accordance with a first aspect of the invention, the heat pump comprises a generator containing a solution of evaporable refrigerant in a less evaporable solvent for generating pressurized vapor phase refrigerant by heating said solution. A condenser receives the generated vapor phase refrigerant for generating heat by condensation of the refrigerant to liquid phase. An evaporator for evaporating the condensed or liquid phase refrigerant is provided extract heat from the environment. An absorber connected in a closed loop working fluid flow circuit with the generator generates absorption heat by absorbing the vapor phase refrigerant from the evaporator with a solution of low refrigerant concentration from the generator for delivery of a solution of high refrigerant concentration to the generator. The absorber includes a section of a closed loop cooling fluid flow circuit for transferring thermal energy from the solution to the cooling fluid in said cooling fluid flow circuit. A first radiator provided in a space to be air-conditioned is connected to the cooling fluid flow circuit. A second radiator connected in series with the first radiator in cooling fluid flow circuit is provided to reduce the temperature of said cooling fluid discharged from the first radiator prior to the cooling fluid entering the absorber.

Since the second radiator is in series with the first radiator, the temperature of the solution in the absorber and hence the evaporation temperature of the fluid in the evaporator is rendered variable as a function of the outdoor temperature, enabling the evaporation temperature to be below the outdoor temperature during heating operation.

In accordance with a second aspect of the invention, the heat pump comprises a generator containing a solution of evaporable refrigerant in a less evaporable solvent for generating pressurized vapor phase refrigerant by heating the solution. An absorber is connected with the generator in a first working fluid flow circuit for recirculation. An indoor heat exchanger, and an outdoor heat exchanger is connected in series with the indoor heat exchanger in a second working fluid flow circuit. A reversal valve in the second flow circuit directs the vapor phase refrigerant from the generator to the indoor heat exchanger during heating operation and also directs vapor phase refrigerant from the generator to the outdoor heat exchanger during cooling operation. The absorber is arranged to receive vapor phase refrigerant through the second flow circuit to permit a solution of low refrigerant concentration from the generator to absorb the received vapor phase refrigerant to generate absorption heat. An indoor radiator and an outdoor radiator are connected in a cooling water flow circuit through the absorber to extract heat from the solution therein to the water in the flow circuit. Means is provided for directing the water from the absorber to the indoor radiator bypassing the outdoor radiator during heating operation and routing the water to the outdoor radiator during cooling operation bypassing the indoor radiator. A third radiator is connected in series with the indoor radiator during heating operation to reduce the temperature of the water entering the absorber and is connected in series with the outdoor radiator during cooling operation.

BRIEF DESCRIPTION OF THE DRAWINGS

The features and advantages of the present invention will be apparent from the following description when read in conjunction with the accompanying drawings, in which.

DETAILED DESCRIPTION

Figure 1:
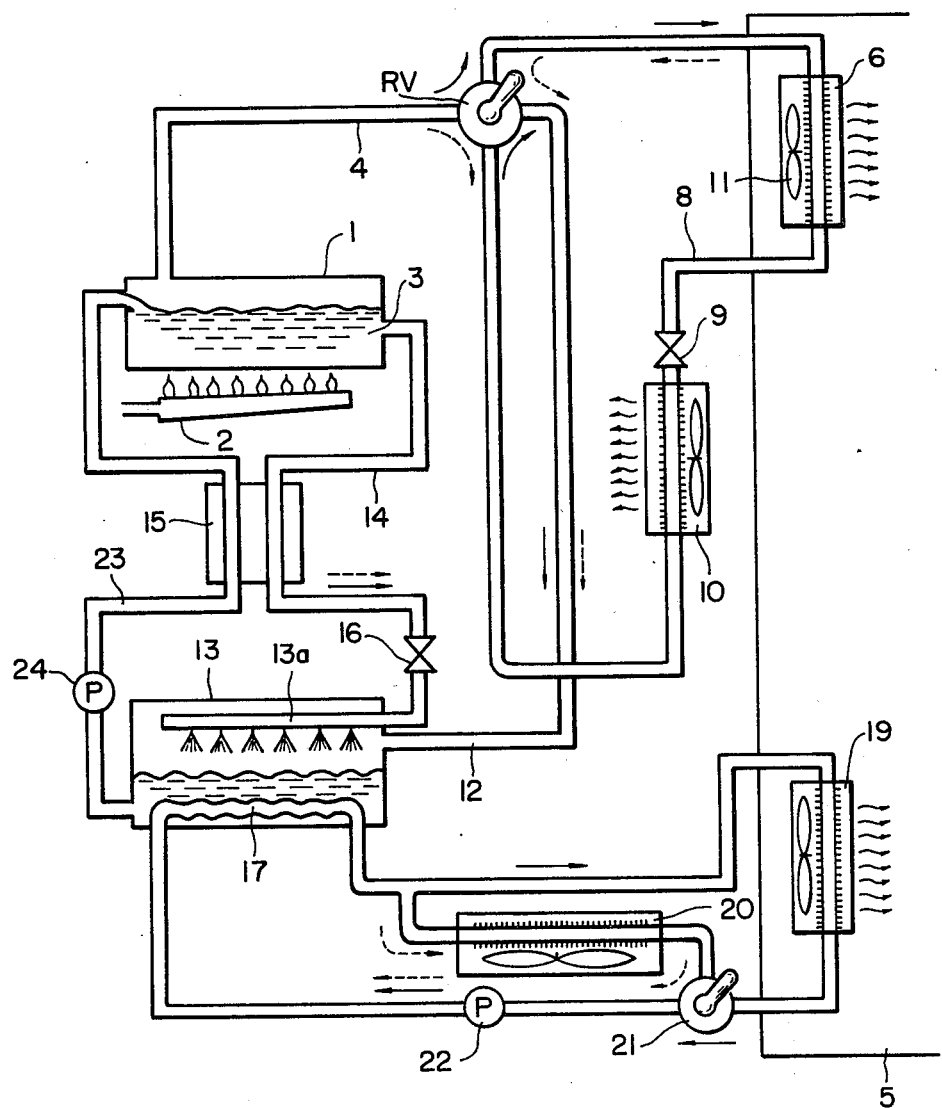
FIG. 1 is an illustration of a prior art absorption type heat pump.

Before describing the present invention reference is first made to FIG. 1 illustrating a prior art absorption-type heat pump system. A solution 3 of evaporable refrigerant in a less evaporable solvent is heated in generator 1 with a gas burner 2 and converted into gaseous phase to flow through a reversal valve RV through a pipe 4. During air heating operation, the valve RV is adjusted to route the vaporized refrigerant to an indoor heat exchanger 6 now operating as a condenser for heating air in an indoor space 5. The indoor heat exchanger 6 comprises a plurality of finned tubes and a fan 11 which directs air to the finned tubes to supply warm air to the indoor space 5. The refrigerant condenses in condenser 6 to release thermal energy and flows through a pipe 8 and a pressure reduction valve 9 to an outdoor heat exchanger 10 of similar construction to that of the indoor heat exchanger 6. The outdoor heat exchanger 10 is now operating as an evaporator to extract heat from the environment. If the outdoor temperature is higher than the evaporation temperature of the refrigerant in the evaporator, evaporation occurs therein and the vapor phase refrigerant is routed by the reversal valve RV via a tube 12 to an absorber 13. A solution of low refrigerant concentration which is termed "strong solution" is supplied from the refrigerant generator 1 through a tube 14 to a heat exchanger 15 where the thermal energy of the fluid in the tube 14 is transferred to fluid flowing in a tube 23, and thence to the absorber 13 via a flow regulating valve 16.

The low refrigerant concentration solution supplied to the absorber is led into a perforated tube 13a and sprayed into the absorber to absorb the gaseous refrigerant supplied via tube 12, whereby a substantial amount of absorption heat is generated in the absorber 13. The solution in the absorber is cooled down by a tube 17 which is a section of a closed loop water cooling flow circuit and changes to a solution of high refrigerant concentration which is termed "weak solution". Water is pumped through the cooling tube 17 by a pump 22 provided in the flow circuit so that thermal energy is transferred from abosrber 13 to the water in the flow circuit. The hot water is routed to an indoor radiator 19 to radiate the thermal energy of the water to the indoor space 5 to provide additional air heating operation. The water discharged from the indoor radiator 19 is routed by a valve 21 to pump 22 during heating operation for return to absorber 13.

The weak solution in the absorber 13 is discharged to a solution pump 24 and pumped through tube 23 to the heat exchanger 15 where it extracts heat from the fluid passing through the tube 14, as described above, and enters the refrigerant generator 1, thereby completing a full cycle of heating operation.

Therefore, the total of the energy given by the indoor radiator 19 and indoor heat exchanger 6, now acting as a condenser, equals the total of energy supplied from the burner 2 and outdoor heat exchanger 10 now acting as an evaporator extracting heat from the outdoor air. Since the cost performance is determined by the ratio of the energy provided by the burner 2 to the sum of the energy extracted by the evaporator 10 and the energy provided by burner 2, it is essential to increase the latter with respect to the former.

For air cooling operation the reversal valve RV is adjusted so that refrigerant from refrigerant generator 1 is routed in the direction of broken-line arrows. The outdoor heat exchanger 10 now acts as a condenser by receiving the vaporized fluid from the generator 1 and the indoor heat exchanger 6 acts as an evaporator by receiving the liquefied refrigerant discharged from outdoor heat exchanger 10 to extract heat from the indoor air by evaporation, the evaporated refrigerant being directed to the absorber 13 through the reversal valve RV. The valve 21 is now adjusted to direct hot water to an outdoor radiator 20 bypassing the indoor radiator 19 and thence to the pump 22. The outdoor radiator 200 has a greater surface area than that of the indoor radiator 19 to reduce the temperature of the cooling water at the entry point of the absorber 13 to a level sufficient to effect absorption in consideration of the high temperature outdoor air.

Figure 2:
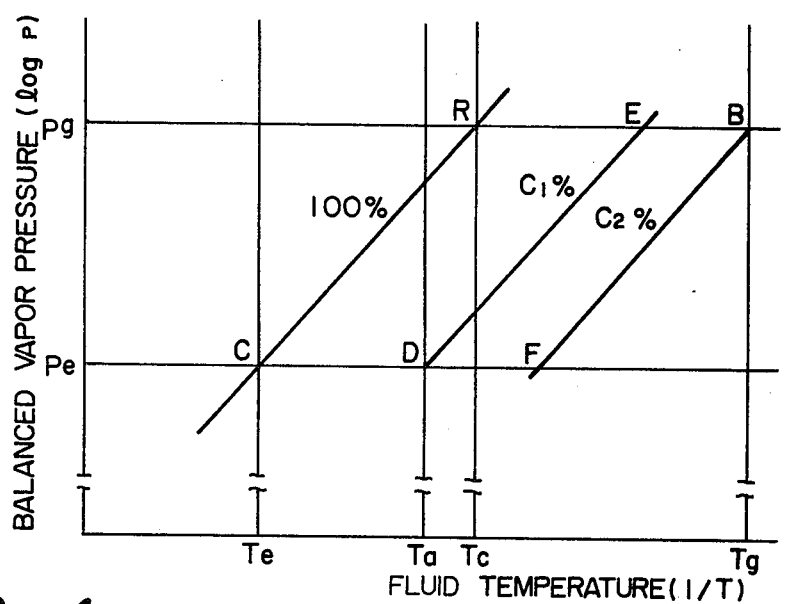
FIG. 2 is an illustration of a Dühring's diagram associated with the FIG. 1 prior art system.

FIG. 2 is an illustration of a Dühring's diagram which represents a plot of the vapor pressure of refrigerant in the generator 1 under equilibrium condition with a solution of different refrigerant concentration as a function of the temperature of the solution. In the Dühring's diagram, the vapor pressure is expressed in logarithm in the ordinate and the temperature is plotted in terms of the reciprocal of absolute temperature in the abscissa. A straight line to the left of the diagram represents a plot for a 100% refrigerant content solution.

At a point A on the 100% line a condensation temperature Tc corresponds to a vapor pressure Pt at which the working fluid must be vaporized in the generator 1. Let Tg denote the maximum temperature of the working fluid of the generator 1. A strong solution of a $C_2\%$ concentration will describe a line which passes through a point B corresponding to Pt and Tg. The temperature Te, at which the working fluid evaporates in the evaporator, corresponds to a vapor pressure Pe at a point C on the 100% line. The minimum temperature Ta of the solution in the absorber 13 is shown as corresponding to the pressure Pe at a point D on a line described by a weak solution of a $C_1\%$ concentration. This $C_1\%$ line intersects the Pg line at a point E and the $C_2\%$ line intersects the Pe line at a point F. The process in the generator 1 and the process from the point F to point D represents the gas absorption process in the absorber 13. A loop including these points represents a full cycle of gas generation and absorption.

The minimum temperature Ta of the working fluid in the absorber 13 is determined by the one at the inlet port of the cooling tube 17 which substantially corresponds to the temperature of the solution at the discharge end of the indoor radiator 19. The latter temperature is usually determined by the room temperature of the indoor space 5, so that the minimum temperature Ta, and hence the evaporation temperature Te, can be considered as a constant value regardless of the outdoor temperature.

In usual practice the evaporation temperature must be lower than the outdoor temperature by at least a certain amount of difference depending on the operating characteristics of the system, a typical value being 5° C. If the evaporating temperature is set at −10° C., the percentage of concentration $C_1$ can be determined from the Dühring's diagram.

However, in such cases the evaporator tends to accumulate frost due to the below-the-freezing point of the evaporation temperature even though the outdoor temperature is higher than the freezing point and the evaporation efficiency reduces considerably. For outdoor temperatures within a range from 5° C. to 10° C., the system is found to operate satisfactory even if the evaporation temperature is set at 0° C. or slightly higher than 0° C. From the coefficient or performance standpoint, it is not desirable that the system have an unnecessarily low evaporation temperature. Another problem associated with the coefficient of performance of the system arises from the fact that the same working fluid is used in the cooling mode as in the heating mode. Since the evaporation temperature of the cooling mode is usually higher than that of the heating mode, typically higher than by 7° C. due to the higher outdoor temperature during summer than the indoor temperature during winter. A typical value of the evaporation temperature during the cooling mode is as low as −3° C. Since the coefficient of performance of the system during the cooling mode is largely dependent on the evaporation temperature so that the efficiency significantly degrades with a lowering of the evaporation temperature, it is also undesirable to reduce the evaporation temperature during the cooling mode. For example, for an evaporation temperature of 7° C., a more than 20% improvement can be achieved in the coefficient of performance as compared with the one obtained when the evaporation temperature is set at −3° C.

It is thus seen that the evaporation temperature of the prior art heat pump system operating in the heating mode is inevitably set at an unnecessarily low temperature in consideration of the coefficient of performance of the system in the heating mode, while at the same time degrading the coefficient of performance of the cooling mode. This problem is particularly severe if the system is used in a relatively warm climate where it is operated in the cooling mode for a relatively long period of time.

The heat pump system of the present invention solves this problem by varying the evaporation temperature as a function of outdoor temperature to assure high operating efficiency for both heating and cooling modes.

Figure 3:
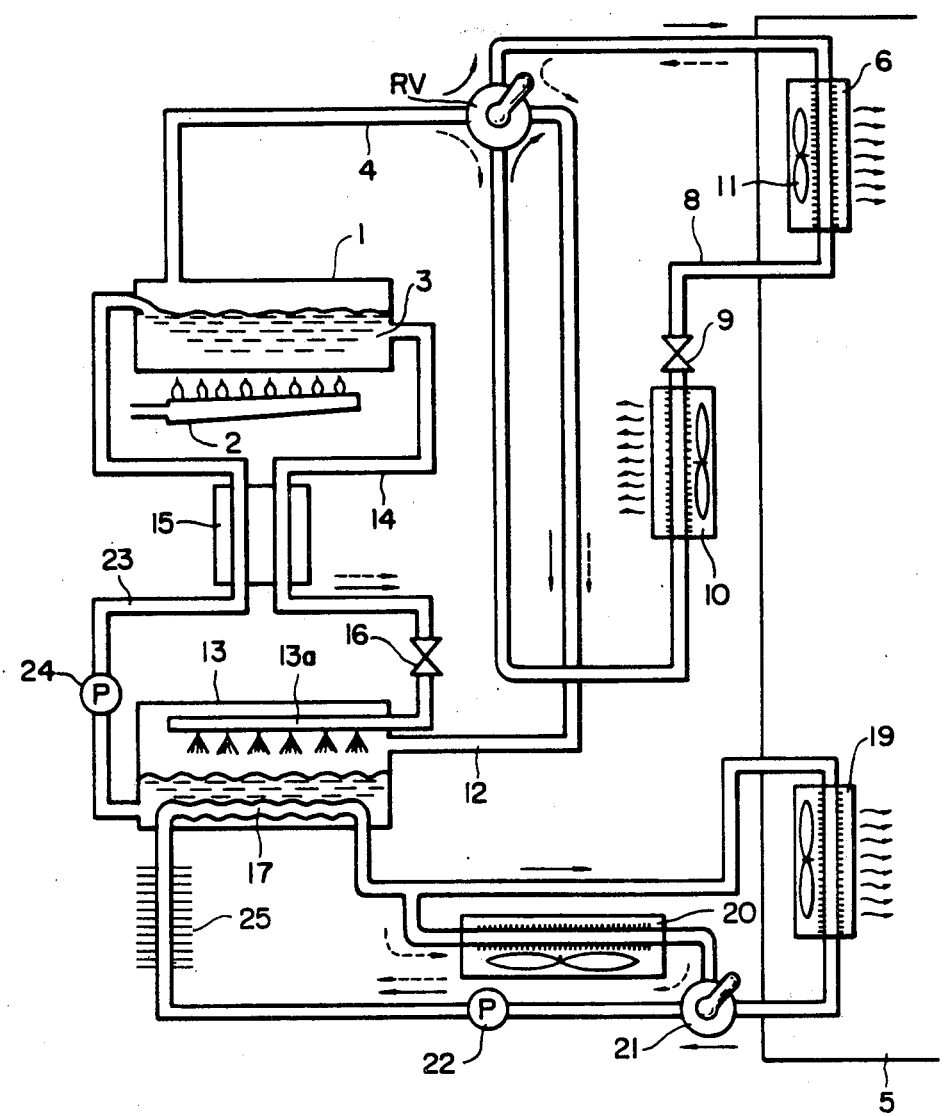
FIG. 3 is an illustration of an absorption type heat pump of the present invention.

Referring now to FIG. 3, the heat pump system of the present invention is illustrated wherein the same reference numerals are used to indicate parts corresponding to those in FIG. 1. The heat pump system of the invention is generally similar to the prior art system of FIG. 1 with the exception that an outdoor heat exchanger or radiator 25 is provided in the water tube which extends between pump 22 and the inlet port of cooling tube 17. The radiator 25 functions to reduce the temperature of the water discharged from the indoor radiator 19 during the heating mode. By appropriately selecting the working efficiency of the outdoor radiator 25, the temperature of the water introduced to the cooling tube 17 and hence the minimum temperature Ta of the absorber 13 can be reduced with a decrease in the outdoor temperature.

More specifically, since the temperature Ta at point D in the Dühring's diagram in FIG. 2 can be reduced with the reduction in the outdoor temperature, the vapor pressuure Pe can also be reduced correspondingly for a given percentage of refrigerant concentration.

While the evaporation temperature Te may reduce as a function of outdoor temperature when the outdoor is relatively cold, it would not decrease unnecessarily when the outdoor temperature is relatively warm, thus preventing the formation of frost during such warm conditions and increasing the operating range of the system. With conventional heat pumps operating on heating mode, on the other hand, the evaporation temperature must be set at such a low fixed value that frost might also develop even though outdoor temperature is relatively warm.

Figure 4A:
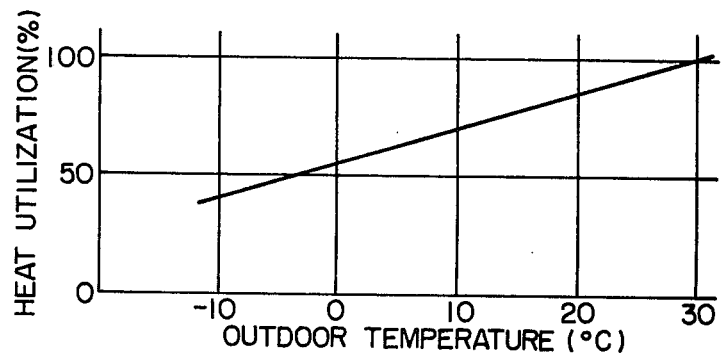
FIGS. 4a and 4b are illustrations of operating characteristics of the embodiment of FIG. 3.
Figure 4B:
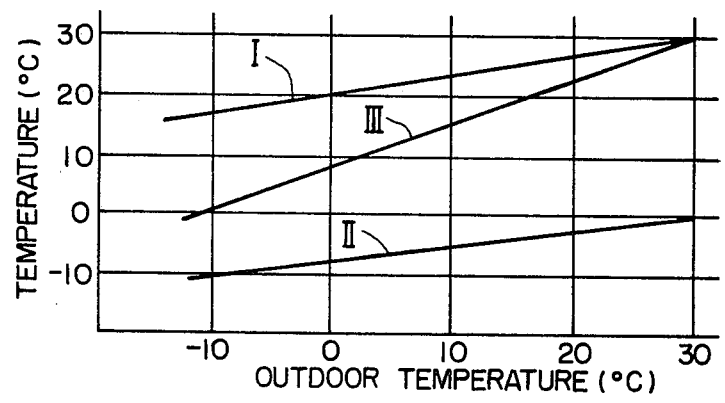

Assuming that the temperature of the water discharged from the indoor radiator 19 is 30° C. and the outdoor temperature is 0° C. and that the outdoor radiator 25 is designed so that it discharges hot water typically at a temperature of 20° C., a reasonable value of the minimum temperature Ta of the absorber 13 is considered to be 30° C. In this instance, the refrigerant concentration of the working fluid is determined on the assumption that for cooling operation the cooling water temperature is 40° C. and the minimum absorption temperature Ta is 50° C. so as to adjust the evaporation temperature at 7° C. With this concentration value, the evaporation temperature during the heating operation is −8° C. when the outdoor temperature is 0° C., so that the difference between them is 8° C. FIG. 4a is a graphic representation of the heat utilization efficiency of the system of the invention as a function of outdoor temperature Tam. This heat utilization efficiency is defined by the ratio of the thermal output of the indoor radiator 19 to the thermal energy generated in the absorber 13. FIG. 4b graphically represents the absorber's cooling water temperature by a straight line I, the evaporation temperature by a line II and the difference between outdoor temperature and evaporation temperature by a line III as a function of outdoor temperature. The heat pump system of the present invvention is thus capable of operating as a space heater for outdoor temperatures as low as −5° C.

Figure 5:
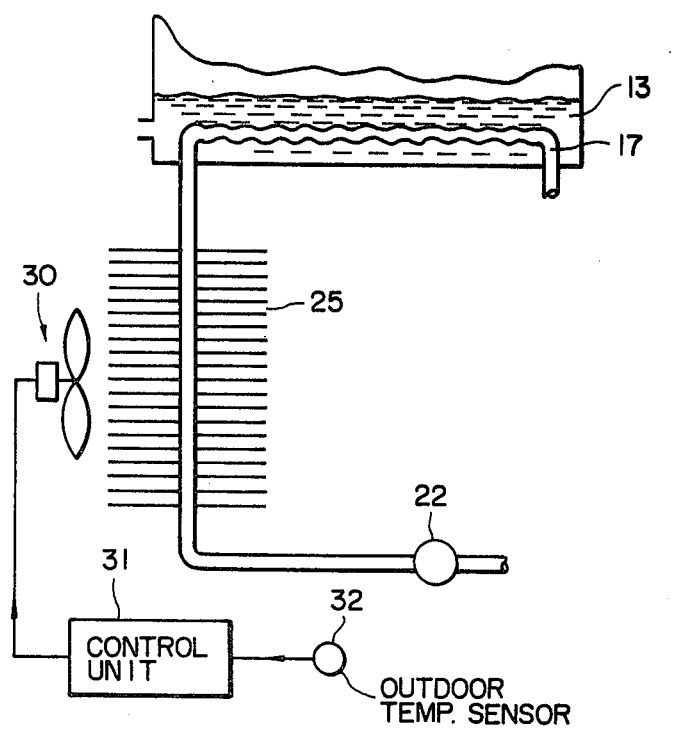
FIG. 5 is an illustration of a modification of the embodiment of FIG. 3.
Figure 6A:
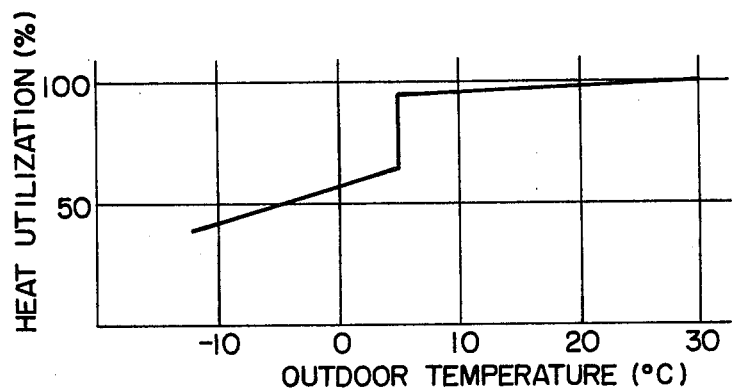
FIGS. 6a and 6b are illustrations of operating characteristics of the embodiment of FIG. 5.
Figure 6B:
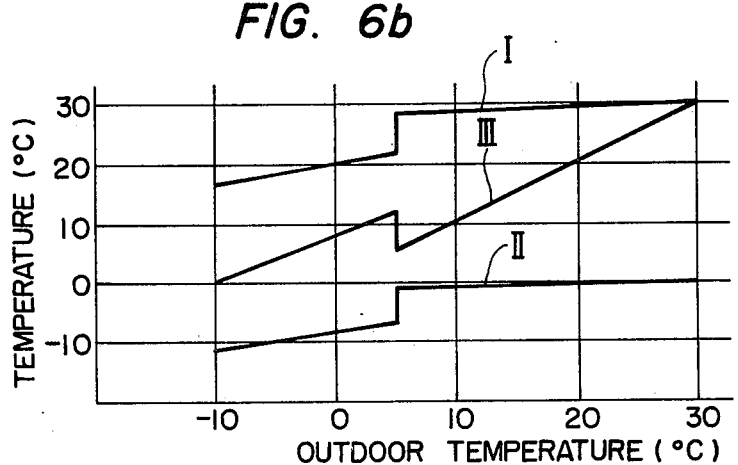

In the embodiment of FIG. 3 the evaporation temperature is below 0° C. at all times during the heating operation. However, the evaporation temperature is not required to be set at such a low temperature when the outdoor temperature is higher than 5° C. Furthermore, the FIG. 3 embodiment has a disadvantage in that the heat utilization efficiency is always below 100% because the absorber 13 controls the evaporation temperature by allowing part of the generated thermal energy to be wasted. To this end, the size of the outdoor radiator 25 is proportioned so that it operates to keep the evaporation temperature to a point above 0° C. so as to achieve maximum heat utilization efficiency when the outdoor temperature is above 5° C. The radiator 25 is provided with a fan 30 as illustrated in FIG. 5 to cool the radiator 25 by forced air. This fan is operated by an output signal from a control unit 31 which takes its input from an outdoor temperature sensor 32. The temperature signal from the sensor 32 is compared in the control unit 31 with a predetermined value representing the reference temperature (5° C.) and the fan control signal is generated when the outdoor temperature falls below 5° C. By the forced air flow the cooling water temperature is decreased to lower the evaporation temperature to a point equal to or lower than 0° C. only when the outdoor temperature is below 5° C. The heat utilization efficiency is graphically illustrated in FIG. 6a. As illustrated, the efficiency is increased to a level higher than 90% during heating operation at outdoor temperatures above 5° C. Although the efficiency may decrease when the outdoor temperature falls below 5° C., the embodiment of FIG. 5 assures a level of efficiency higher than 50% when outdoor temperature falls to as low as −5° C. The evaporation temperature is illustrated in FIG. 6b in relation witth other temperature parameters corresponding to FIG. 4b.

Figure 7A:
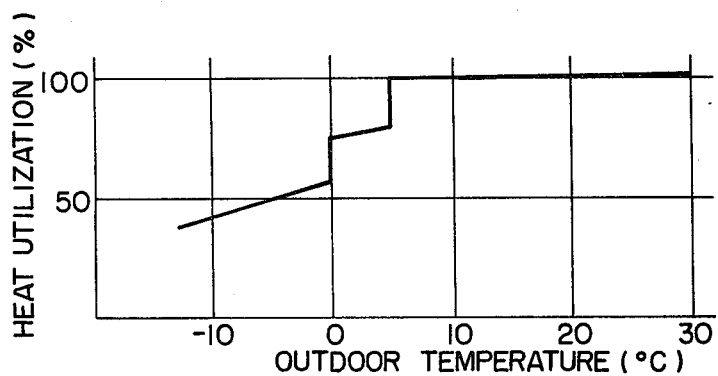
FIGS. 7a and 7b are illustrations of operating characteristics of an embodiment in which the radiation efficiency of the outdoor radiator is controlled in two discrete steps as a function of outdoor temperature.
Figure 7B:
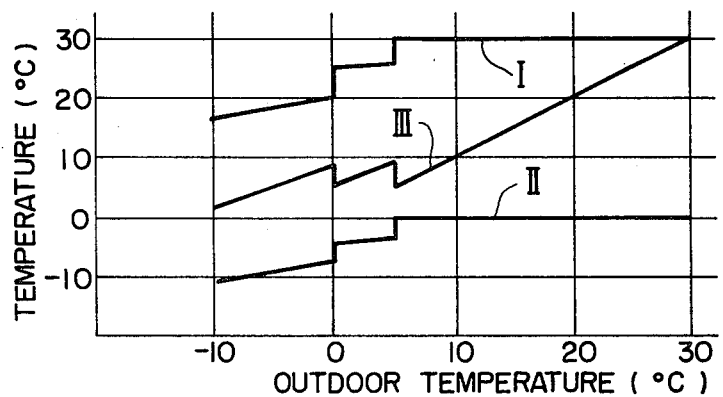
Figure 10:
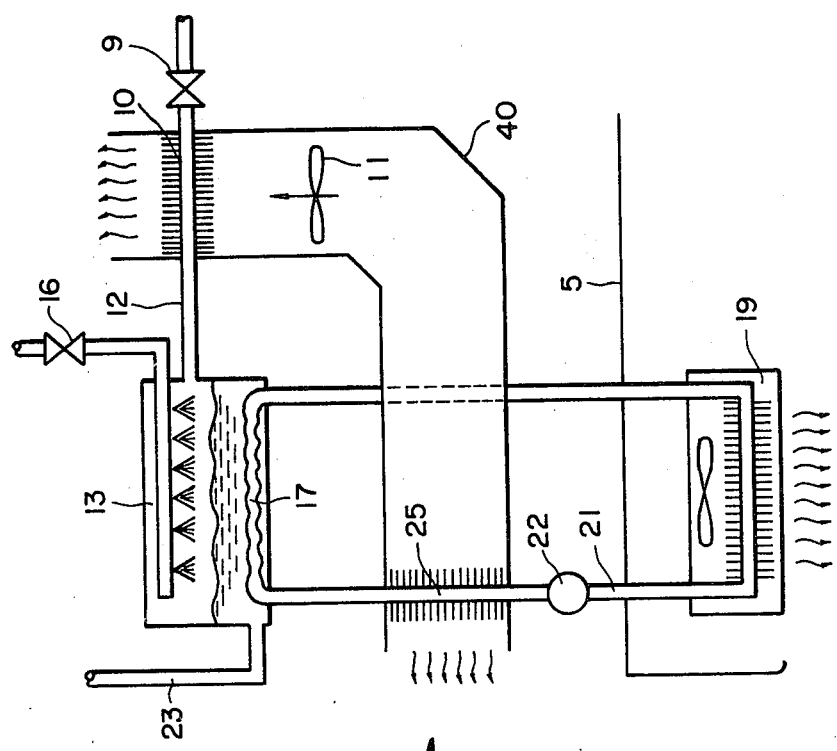
FIG. 10 is an illustration of a modification of the embodiments of FIGS. 3 and 9.

The heat utilization efficiency could be further improved by controlling the radiating efficiency of the radiator 25 in three or more steps in response to different zones of outdoor temperature. For example, when the outdoor temperature is in a high temperature zone, the convecting air around the radiator 25 is shut off completely to render the radiator 25 substantially inoperative. In a medium temperature zone, natural convection is used to increase the radiation efficiency and for a low temperature zone, forced air is provided to increase the radiation efficiency. In this way, the heat utilization efficiency could be improved as illustrated in FIG. 7a, while the evaporation temperature in relation with other temperature parameters is graphically shown in FIG. 7b.

Figure 8:
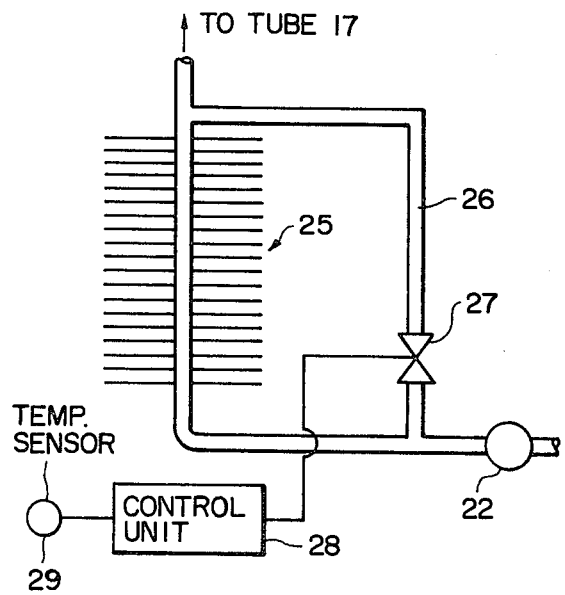
FIG. 8 is an illustration of a further modification of the embodiment of FIG. 3.

The outdoor temperature responsive control over the evaporation temperature can also be achieved continuously as a nonlinear function of the sensed outdoor temperature. FIG. 8 accomplishes this nonlinear control by a bypass tube 26 connected in shunt with the outdoor radiator 25 with an electromagnetic flow control valve 27 provided in the bypass tube 26. This control valve 27 is controlled in response to a signal from a valve control unit 28 which takes its input from an outdoor temperature sensor 29. The control unit provides a signal so that when the outdoor temperature is relatively high the control valve 27 is fully open to cause water to substantially bypass the radiator 25 so that the bypassing water enters the cooling tube 17 without lowering its temperature and when the outdoor temperature decreases the valve 27 is correspondingly closed to increase the amount of water passing through the radiator 25 to decrease the cooling water temperature and hence the evaporation temperature.

Figure 9:
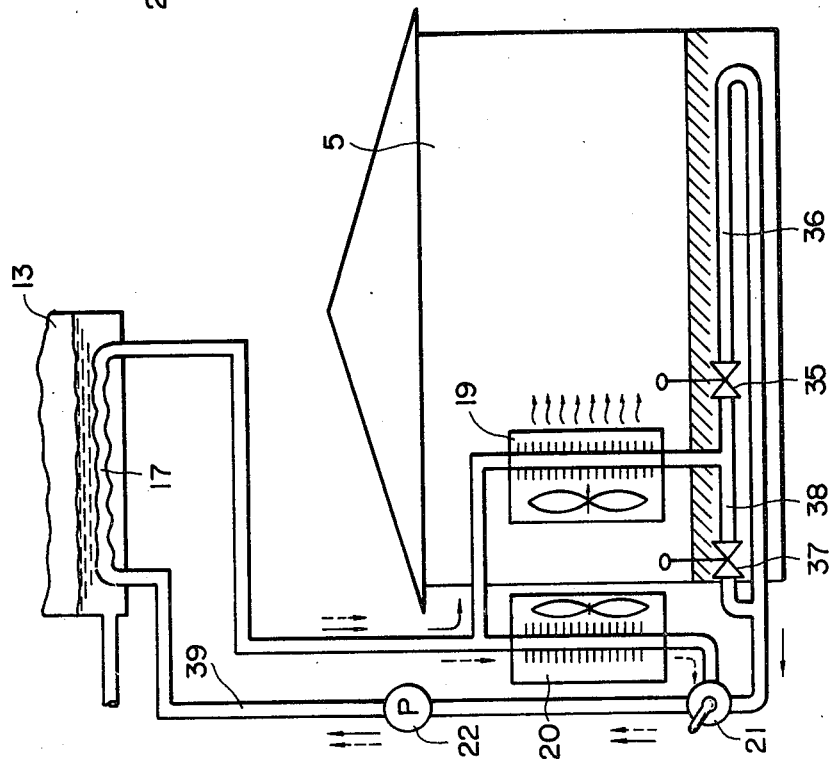
FIG. 9 is an illustration of a second embodiment of the heat pump of the present invention.

FIG. 9 is an illustration of a further modification of the embodiment of the invention in which the cooling water tubing is laid under the floor of the indoor space 5 to provide floor heating by utilizing the energy transferred from the absorber 13 which would otherwise be wasted. The under floor tubing comprises a tube 36 which leads from the discharge outlet of the indoor radiator 19 to the pump 22 and a bypass tube 38 connected between the discharge end of the radiator 19 and the pumps 22. Manually controlled valves 35 and 37 are provided respectively in the tubes 36 and 38 to allow the water discharged from the radiator 19 to be selectively routed to one of the tubes 36 and 38. After passing through the under floor tube 36 or 38 and pumped by pump 22 through a tube 39, the cooled water returns to the absorber 13, whereby the temperature of the solution in the absorber 13 and hence the evaporation temperature Te is determined. During heating operation the valve 35 is open to direct the hot water through the tube 36 while valve 37 is closed. In this case, the water at the entry point of the indoor radiator 19 is typically at 60° C. and at the discharge point thereof its temperature is about 35° C. and after passing through the under-floor tube 36, the typical value of the water temperature at the outlet point of tube 36 (which is nearly equal to the temperature at the entry point of absorber 13) decreases to as low as 28° C. to which the corresponding evaporation temperature is −20° C. Therefore, it will be seen that in cases where the outdoor temperature goes low to such a level that the evaporator 10 is not capable of extracting outdoor thermal energy at the evaporation temperature of 3° C. with the hot water passing through the bypass tube 38, the valve 37 is now closed and the valve 35 opened. The evaporation temperature can now reduce below the outdoor temperature and the evaporator 10 is able to extract outdoor thermal energy while the indoor temperature is increased by floor heating. When the outdoor temperature rises to a relatively high level the valve 37 is opened to allow the thermal energy of the hot water to be solely dissipated by the indoor radiator 19, so that it is possible to prevent the formation of frost on the evaporator 10 since its evaporation temperature does not fall below the freezing point.

The water temperature at the entry point of the absorber 13 can be reduced by directing the water discharged from the indoor radiator 19 to a second indoor radiator and thence to the absorber 13, rather than through the under floor tubing, in so far as the indoor temperature setting during winter is about 20° C. In such instance, the second indoor radiator can be advantageously located in a low temperature area of the house.

A further modification of the present invention is illustrated in FIG. 11 in which a duct 40 is provided to accommodate the outdoor radiator 25 at the air inlet point of the duct and the outdoor heat exchanger or evaporator 10 at the air outlet port of the duct 40 with its blowing fan 11 being located on the upstream side of the finned tubing of the evaporator 10. With this arrangement, the outdoor air entering the duct 40 is warmed up by the radiator 25 and directed to the evaporator 10 by the fan 11, so that the heat radiated by the outdoor radiator 25 is advantageously utilized to prevent formation of frost on the evaporator 10.

In summary, the heat pump system as taught by the present invention uses a solution whose refrigerant concentration is determined so that the required evaporation temperature can be obtained for cooling operation, and the same solution is used effectively during the heating operation by controlling the evaporation temperature as a function of the outdoor temperature, whereby the problem associated with the use of the same solution during heating and cooling operations is solved.

What is claimed is:
1. An air conditioning system comprising:
  a generator containing a solution of evaporable refrigerant in a less evaporable solvent for generating pressurized vapor phase refrigerant by heating said solution;

a condenser receiving the generated vapor phase refrigerant for generating heat by condensation of the refrigerant to liquid phase;

an evaporator for evaporating the liquid phase refrigerant to extract heat from the environment;

an absorber connected in a closed loop working fluid flow circuit with said generator to generate absorption heat by absorbing the vapor phase refrigerant from said evaporator with a solution of low refrigerant concentration from said generator for delivery of a solution of high refrigerant concentration to said generator, the absorber including a section of a closed loop cooling fluid flow circuit for transferring thermal energy from the solution to the cooling fluid;

a first radiator provided in a space to be air-conditioned and connected in said cooling fluid flow circuit; and a second radiator located outside of said air-conditioned space and connected in said cooling fluid flow circuit downstream of said first radiator to reduce the temperature of the cooling fluid discharged from said first radiator by an amount depending on the outdoor temperature prior to the cooling fluid entering said absorber.

2. An air conditioning system as claimed in claim 1, further comprising means for controlling the radiation capacity of said second radiator.

3. An air conditioning system as claimed in claim 2, wherein said controlling means includes means for controlling said radiation capacity as a function of the outdoor temperature.

4. An air conditioning system as claimed in claim 1 or 2, wherein said controlling means comprises a fan for directing a forced air flow across said second radiator and means for driving said fan to control the air flow rate as a function of the outdoor temperature.

5. An air conditioning system as claimed in claim 2, wherein said controlling means comprises a bypass flow circuit connected in shunt with said second radiator and means provided in said bypass flow circuit for controlling the flow of cooling fluid therein.

6. An air conditioning system as claimed in claim 5, wherein said means in said bypass flow circuit comprises an electromagnetic valve and means for controlling said electromagnetic valve as a function of the outdoor temperature.

7. An air conditioning system as claimed in claim 1, wherein said second radiator is located under the floor of said air-conditioned space.

8. An air conditioning system as claimed in claim 1 or 7, further comprising means for directing the air heated by said second radiator to said evaporator to prevent formation of frost on said evaporator.

9. An air conditioning system comprising:

a generator containing a solution of evaporable refrigerant in a less evaporable solvent for generating pressurized vapor phase refrigerant by heating said solution;

a condenser receiving the generated vapor phase refrigerant for generating heat by condensation of the refrigerant to liquid phase;

an evaporator for evaporating the liquid phase refrigerant to extract heat from the environment;

an absorber connected in a closed loop working fluid flow circuit with said generator to generate absorption heat be absorbing the vapor phase refrigerant from said evaporator with a solution of low refrigerant concentration from said generator for delivery of a solution of high refrigerant concentration to said generator, the absorber including a section of a closed loop cooling fluid flow circuit for transferring thermal energy from the solution to the cooling fluid;

at least two radiators connected in series in said cooling fluid flow circuit, at least one of said radiators being located upstream of the other radiator in a space to be air-conditioned;

a bypass flow circuit connected in shunt with one of said radiators which is downstream with respect to the other radiator; and means for controlling the amount of said cooling fluid in said bypass flow circuit as a function of outdoor temperature.

10. An air conditioning system as claimed in claim 9, wherein said one of said radiators is located under the floor of said air-conditioned space.

11. An air conditioning system as claimed in claim 9, further comprising means for directing the air heated by one of said radiators to said evaporator to prevent formation of frost in said evaporator.

12. A heat pump comprising, a generator containing a solution of evaporable refrigerant in a less evaporable solvent for generating pressurized vapor phase refrigerant by heating said solution, an absorber connected with said generator in a first working fluid flow circuit for recirculation, an indoor heat exchanger, an outdoor heat exchanger connected in series with the indoor heat exchanger in a second working fluid flow circuit, a reversal valve in said second flow circuit for routing the vapor phase refrigerant from said generator to said indoor heat exchanger during heating operation and routing said vapor phase refrigerant from said generator to said outdoor heat exchanger during cooling operation, said absorber being arranged to receive vapor phase refrigerant through said second flow circuit to permit a solution of low refrigerant concentration from said generator to absorb the received vapor phase refrigerant to generate absorption heat, an indoor radiator, an outdoor radiator connected in series with the indoor radiator in a cooling fluid flow circuit which passes through said absorber for transferring thermal energy from said absorber to the cooling fluid, and means for routing the cooling fluid from said absorber to said indoor radiator and thence to said outdoor radiator during heating operation and routing said water from said absorber to said outdoor radiator bypassing said indoor radiator during cooling operation, whereby the temperature of the cooling fluid at the entry point of said absorber is rendered variable as a function of the outdoor temperature during heating operation to thereby vary the temperature at which the refrigerant is evaporated in said outdoor heat exchanger as a function of said outdoor temperature.

13. A heat pump as claimed in claim 12, further comprising means for controlling the radiation capacity of said outdoor radiator during heating operation.

14. A heat pump as claimed in claim 13, wherein said controlling means comprises means for controlling said radiation capacity as a function of outdoor temperature.

15. A heat pump as claimed in claim 12 or 13, wherein said controlling means comprises a fan for directing a forced air flow to said outdoor radiator and means for driving said fan to control said air flow as a function of the outdoor temperature.

16. A heat pump as claimed in claim 13, wherein said controlling means comprises a bypass tube connected in shunt with said outdoor radiator and means provided in said bypass tube for controlling the flow of cooling fluid in said bypass tube.

17. A heat pump as claimed in claim 16, wherein said means in said bypass tube comprises an electromagnetic valve and means for controlling said electromagnetic valve as a function of outdoor temperature.

18. A heat pump as claimed in claim 12, further comprising means for directing the air heated by said outdoor radiator to said outdoor heat exchanger to prevent formation of frost in said outdoor heat exchanger during heating operation.

19. A heat pump as claimed in claim 12, further comprising a second outdoor radiator, wherein said cooling fluid routing means includes means for routing the cooling fluid to said second outdoor radiator and thence to the first-mentioned outdoor radiator bypassing said indoor radiator during cooling operation, the total radiation capacity of said first and second outdoor radiators being greater than the radiation capacity of said indoor radiator.

20. A heat pump comprising a generator containing a solution of evaporable refrigerant in a less evaporable solvent for generating vapor phase refrigerant by heating said solution, an absorber connected with said generator in a first working fluid flow circuit for recirculation, an indoor heat exchanger, an outdoor heat exchanger connected in series with said indoor heat exchanger in a second working fluid flow circuit with said indoor heat exchanger, a reversal valve in said second flow circuit for routing the vapor phase refrigerant from said generator to said indoor heat exchanger during heating operation and routing said vapor phase refrigerant from said generator to said outdoor heat exchanger during cooling operation, said absorber being arranged to receive vapor phase refrigerant through said second flow circuit to permit a solution of low refrigerant concentration from said generator to absorb the received vapor phase refrigerant to generate absorption heat, at least two radiators connected in series in a coolling fluid flow circuit which passes through said absorber for transferring thermal energy from said absorber to the cooling fluid, at least one of said radiators being located in a space to be air-conditioned, a bypass tube connected in shunt with the one of said radiators which is downstream with respect to the other, a second valve in said bypass tube for controlling the flow of cooling fluid in the bypass tube, and means for routing the cooling fluid from said absorber to said series connected radiators during heating operation and routing said cooling fluid to bypass said series connected radiators.

21. A heat pump as claimed in claim 20, wherein said one of said radiators is located under the floor of said air-conditioned space.

22. A heat pump as claimed in claim 20, further comprising means for directing the air heated by one of said radiators to said outdoor heat exchanger to prevent formation of frost in said outdoor heat exchanger during heating operation.

23. A heat pump as claimed in claim 22, further comprising an outdoor radiator in said cooling water flow circuit and means for routing the water from said absorber to said outdoor radiator bypassing said series connected radiators during cooling operation.

* * * * *